Aug. 30, 1966  F. T. MacKENZIE ET AL  3,269,594
NAIL DISTRIBUTORS
Filed Jan. 28, 1963  7 Sheets-Sheet 7

United States Patent Office 3,269,594
Patented August 30, 1966

3,269,594
NAIL DISTRIBUTORS
Fred T. MacKenzie, Beverly, Frank C. Mattern, Jr., Wenham, and Joseph F. Schuster, Beverly, Mass., assignors to United Shoe Machinery Corporation, Flemington, N.J., a corporation of New Jersey
Filed Jan. 28, 1963, Ser. No. 254,297
13 Claims. (Cl. 221—68)

This invention relates to nail distributors for use, for example, in a heel attaching machine such as is disclosed in an application for United States Letters Patent Serial No. 256,885, filed February 7, 1963, in the names of Fred T. MacKenzie et al. and now U.S. Patent No. 3,221,967.

In nail distributors of the general type herein illustrated and having tilt pot hoppers it has been found that loose nails in said hoppers have a tendency to cause jams in raceways of the hoppers and accordingly to interfere with the proper "flow" of oriented nails, which hang by their heads in the nailways, along said nailways and into the upper ends of inclined raceways of the distributors.

It is an object of the present invention to provide a nail distributor of the type above mentioned which is simple in construction and is effective in its operation. With the above object and considerations in view and in accordance with a feature of the present invention a tilt pot hopper of the illustrative distributor is provided with a nailway clearer having the form of a brush which sweeps rearwardly over the floor of the hopper to clear loose nails from nailways, which are formed in said floor, when the hopper is being swung from a raised inclined position to a lowered inclined position, said brush being spaced from said floor as it moves forwardly in the hopper during movement of the hopper to its inclined raised position.

The present invention consists in the aforesaid brush which in accordance with another feature of the invention limits forward movement of the loose nails in the hopper and in hereinafter described features including yielding drive units for insuring that the machine parts shall not be damaged when a transfer slide and an inverting bar of the machine are prevented from moving through their normal cycles by reason of bent or otherwise deformed nails interfering with said cycles, improved tunnels which are formed over the forward portions of the nailways of the hopper and various other features hereinafter described, reference being had to the accompanying drawings which illustrate one embodiment of the invention, selected for purposes of illustration, said invention being fully described in the following description and claims.

The illustrative nail distributor is disclosed as embodied in the heel attaching machine described in the above-mentioned application Serial No. 256,885 and comprises a tilt pot hopper 20, a composite raceway block 22 having a plurality of inclined raceways 24 into the upper ends of which nails 26, hanging by their heads, are fed from nailways 28 of the hopper, a transfer slide 30 (FIGS. 2, 3, 6 and 12) having vertical parallel slots 32 for receiving leading nails from the lower ends of the raceways of the block and for delivering them to channels 34 formed in a front plate 36 which may be quickly detached from the composite raceway block for repair purposes but is normally secured to the block.

The nails 26 delivered by the transfer slide 30 fall down the channels 34 of the front plate 36 and into bores 38 formed in an inverting bar 40 with their heads resting on flared entrance portions 42 of said bores, the bar being subsequently rotated in response to rearward movement of a nailing die slide 44 (FIG. 1), which corresponds to the slide (88) of the machine disclosed in said application Serial No. 256,885, causing the nails to be delivered heads down into passages 46 of funnels 47 of a nail guiding unit 48 and through flexible tubes 50 into the tubes 51 of an interchangeable tube holder or nail loader 52.

As will be hereinafter explained, the hopper 20 and the transfer slide 30 are also operated in response to movement of the nailing die slide 44 (FIG. 1), suitable yielding drive units 54 (FIGS. 1 and 2), 56 (FIGS. 1, 2, 5 and 6) being provided to insure that in case of jamming of nails between the transfer slide 30 and the raceway block 22 and between the inverting bar 40 on the one hand and the front plate and the nail guiding unit on the other hand the machine will not be damaged.

The tilt pot hopper 20 comprises a steel front bar 58 (FIGS. 1, 3, 9 and 11) having at its opposite sides upstanding flanges 60 to which are secured trunions 62 journaled in bores of upstanding bosses 64 of a mount 66 which is secured to the main frame 68 of the heel attaching machine. Secured by screw and dowel bushing connections 70 to the front bar 58 is a heavy steel floor plate 72 which forms the major portion of the bottom of the hopper 20 and in which the nailways 28 are formed.

Secured by screws 74 (FIGS. 1 and 3) to the floor plate 72 is a box-like housing 76 to opposite sides of which is secured a beam 78. Initially secured by detachable fastening means 80 to the beam 78 is a baffle plate 82 which is commonly spaced a predetermined distance above a flat upper floor 84 of the plate 72 of the hopper 20. The upper floor 84 of the plate 72 has formed in it a plurality of elongated cavities 86 which are arranged parallel to each other, the forward portions of said cavities being divided by the nailways 28 which are adapted to receive the shanks of the nails 26, the heads of said nails oriented in said nailways resting on the bottoms of the cavities.

Figure 3:
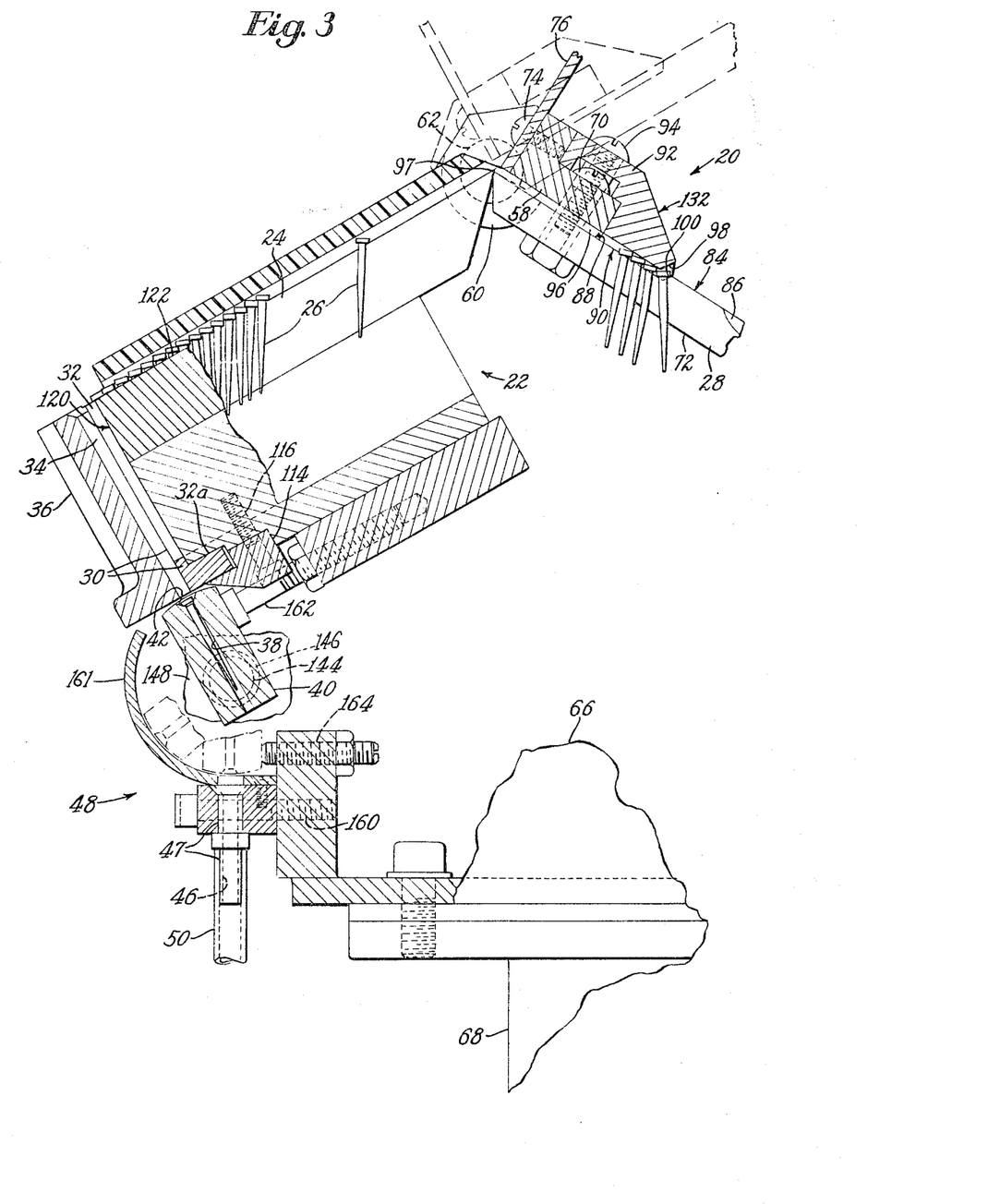
FIG. 3 is a vertical longitudinal section of the distriubtor partly on the line III—III of FIG. 2.
Figure 4:
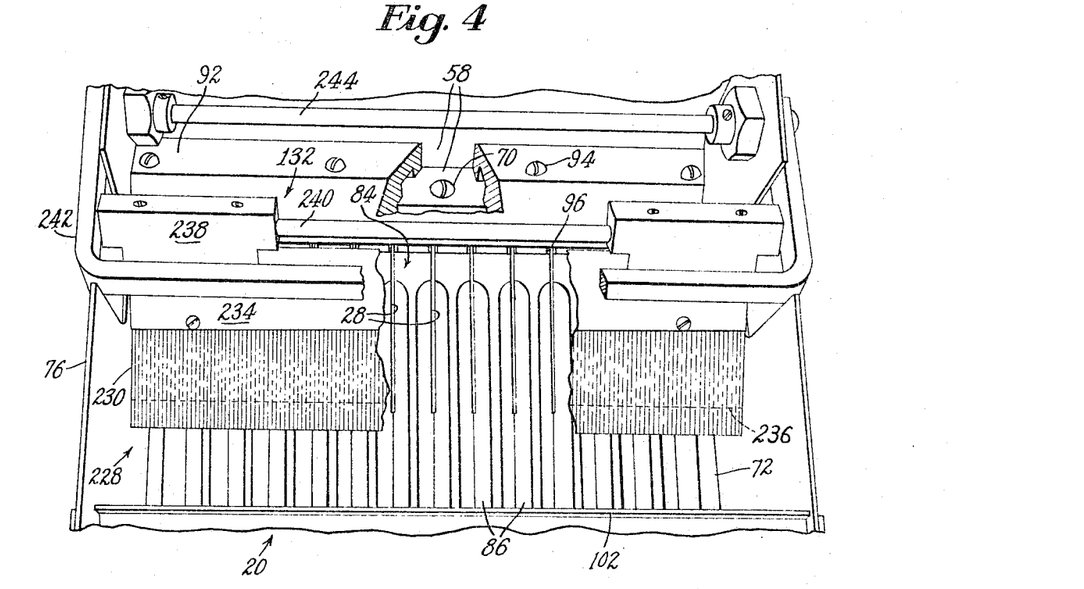
FIG. 4 shows a forward portion of the interior of a tilt pot hopper of the distributor as viewed in the direction of the arrow 4 of FIG. 1.
Figure 5:
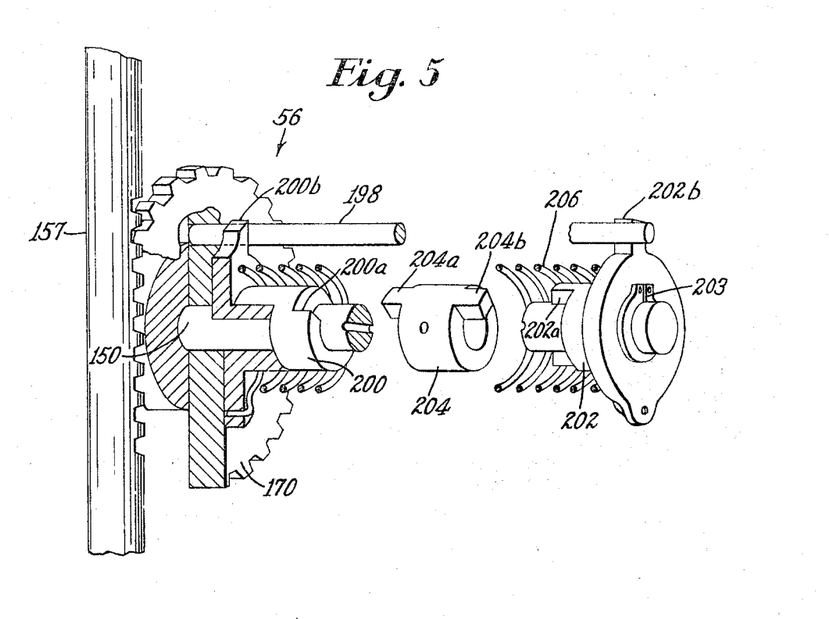
FIG. 5 is an exploded view showing details of a yielding drive unit through which an inverting bar of the distributor is operated.
Figure 6:
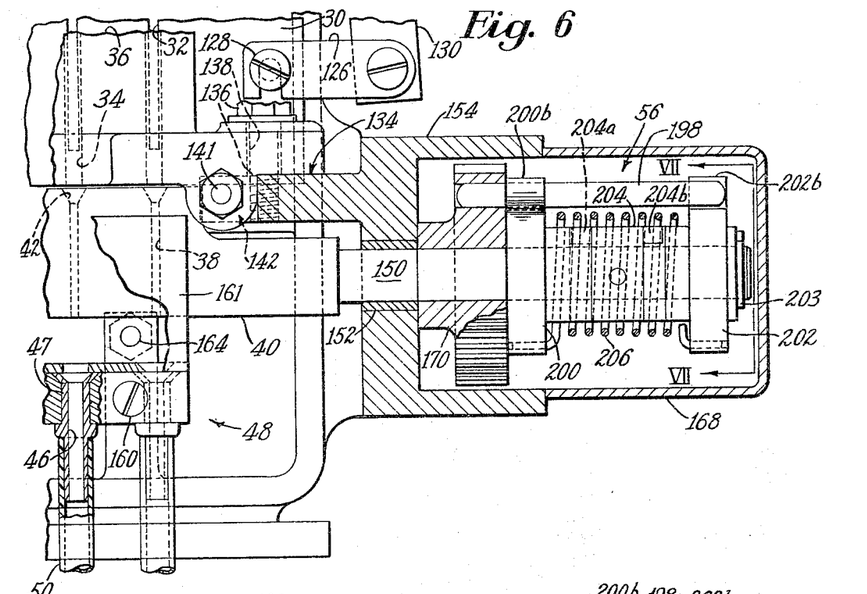
FIG. 6 is a section on the line VI—VI of FIG. 1.

The floor plate 72 has at its forward end a flat low face or floor portion 88 (FIGS. 3, 9 and 11) upon which rests a flat bottom face 90 of a ramp block 92 secured by screw and dowel bushing connections 94 (FIGS. 3, 4 and 9) to the front bar 58. Formed in the bottom face 90 of the ramp block 92 are a purality of parallel grooves forming with the low face 88 of the floor plate 72 tunnels 96 which extend forwardly and rearwardly of the hopper 20 over the nailways 28 and are disposed at right angles to a common axis 97 of the trunnions 62. The tunnels 96 have rear entrance portions upper and lower faces 98, 100 respectively of which are planar and are inclined at a substantial angle to the flat faces 84, 88 respectively of the plate 72, the low face 100 of each of said tunnels forming with said low face 88 a shoulder which will be referred to later. The tunnels 96 are of a suitable size slidingly to receive, with a slight amount of clearance, the heads of nails the shanks of which are oriented in the nailways 28, the construction and arrangement being such that the heads of the nails in the tunnels cannot ride up on one another and will slide smoothly forward along the tunnels when the hopper is moved to its raised dash-line position (FIG. 3). When the hopper 20 is swung to its lowered starting position nails in the tunnels 96 slide back along the tunnels but are prevented from riding out of said tunnels by shoulders formed by the lower faces 100 of the entrance portions of the tunnels.

The nailways 28 of the tilt pot hopper 20 extend forwardly to the axis 97 of the trunnions 62, said hopper being swung from its lowered or idle full-line position (FIG. 1) to its raised dash-line position and back again to its full-line position about the axis of the trunnions during the cycle of the machine causing nails in the nailways of the hopper to be fed into the raceways 24 of the composite raceway block 22 when the hopper is moved to its raised dash-line position.

In order that different portions of the interior of the tilt pot hopper 20 shall be accessible to the operator, the box-like housing 76 of the hopper has mounted on it forward and rearward covers 102, 104 and a back cover 106 hinged respectively to said housing, the covers being held in their closed positions by the provision of detachable fastening means 108, 110 and 112 respectively.

Mounted for lateral sliding movement across the front end of the composite raceway block 22 is the transfer slide 30 which has a rearwardly extending foot portion 32a (FIG. 3) resting on a pair of laterally spaced shelves 114 secured by screws 116 to a bottom of the raceway block 22, such a construction insuring that the transfer slide is held against front faces 120 of parallel bars 122 which form part of the raceway block and between which the raceways 24 are formed. The transfer slide 30 is further held adjacent to the faces 120 of the bars 122 of the composite raceway block 122 by an angle plate 124 (FIG. 2) screwed to the left side of the block, as viewed from the front of the machine, and by a link 126 (FIGS. 2, 6 and 12) which is normally hooked onto a shoulder screw 128 secured to the slide and which, as will appear later, has its other end pivotally connected to the lower end of a bell crank lever 130 hereinafter described.

It will be noted that the cavities 86 in the flat upper face 84 of the floor of the hopper 20 terminate short of the ramp block 92, which has a ramp face 132 extending to said upper face 84, the heads of the nails 26 being in engagement with said upper face 84 as they enter the tunnels 96.

Figure 2:
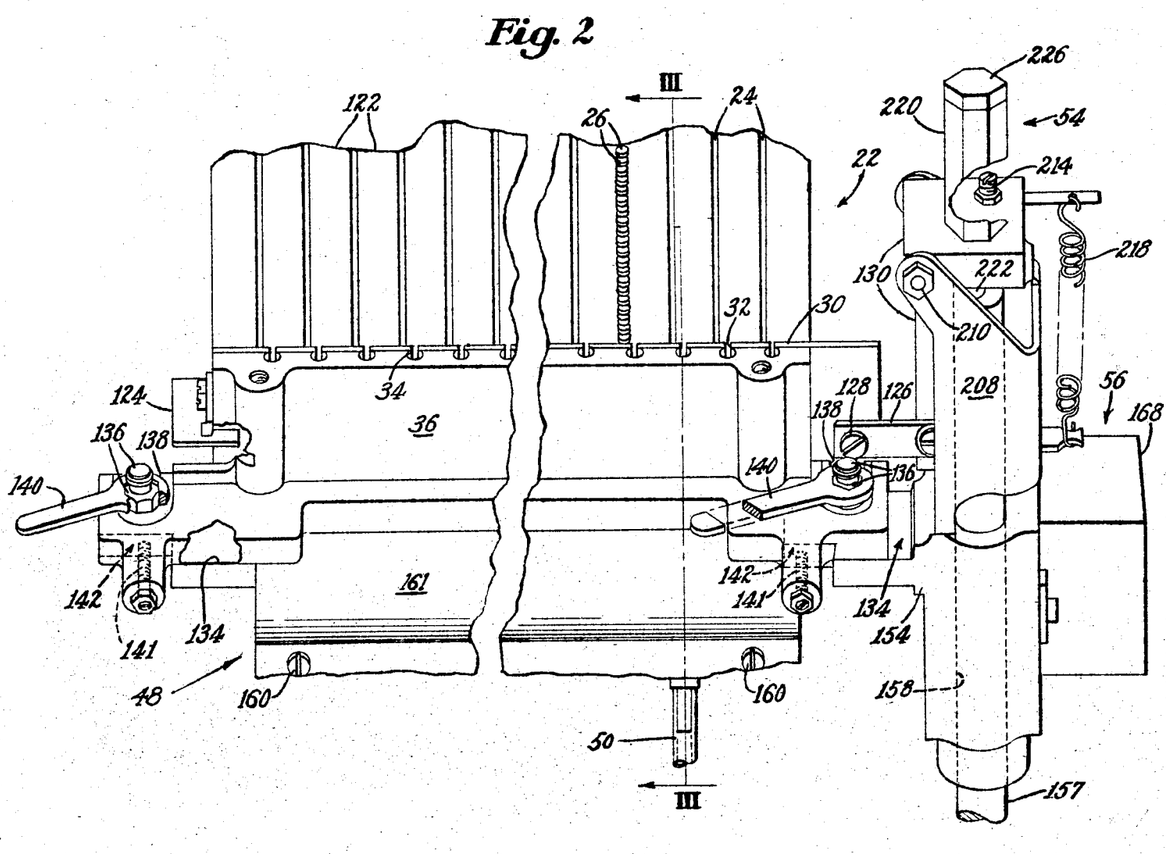
FIG. 2 shows a front portion of the distributor as viewed on the line II—II of FIG. 1.

As shown in FIG. 2, the raceway block 22 has formed at its forward lower corners ledges 134 into which are threaded upstanding headed screws 136 and mounted on these ledges are rearwardly extending flange portions of the front plate 36, said flange portions having formed in them U-shaped slots 138 which straddle the upstanding screws 136, the front plate being clamped against said ledges by the screws on the heads of which wrenches 140 are mounted. The operating position of the front plate 36 toward and away from the transfer slide 30 is determined by the engagement of screws 141 threaded into the front plate with stop faces 142 respectively on the raceway block 22, the construction and arrangement being such that the front plate does not bear tightly against the transfer slide, there being a slight amount of clearance between these two members.

As above explained, the slots 32 formed in the transfer slide 30 are separated by a distance equal to the distance between the raceways 24, the vertical channels 34, which are formed in the front plate 36, being laterally offset about ¼" from the ends of the associated raceways. In accordance with common practice the transfer slide 30 is reciprocable transversely between positions in which the slots 32 of the slide register respectively with the forward ends of the raceways 24 to receive the leading nails from the raceways, and positions in which said slots register with the channels 34 formed in the rear face of the front plate 36, said nails, which hang with their heads overlying the upper edge of the transfer slide, dropping heads up through the channels of the front plate and into the bores 38 of the inverting bar 40.

The inverting bar 40 has secured to its left end, as viewed from the front of the machine, a shaft 144 (FIG. 3) which is journaled in a bearing 146 of a lug 148 secured to the mount 66 and has secured to its right end a shaft 150 rotatable in a bearing 152 (FIG. 6) of a bracket 154 which is secured to the mount by screws 156. As will be explained later, the shaft 150 is operatively connected to a rack 157, which is vertically reciprocable in a guideway 158 formed in the bracket 154, by the yieldable drive unit 56, which as above explained, permits the rack to be raised and lowered through its cycle without damage to the machine in the event that a defective or improperly alined nail should prevent the normal operation of the inverting bar 40.

Secured by screws 160 (FIGS. 2, 3 and 6) to the main frame 68 and arranged below the inverting bar 40 is the nail guiding unit 48 which comprises an arcuate plate 161 adapted to be engaged by the heads of the nails 26 in the bores 38 of said bar as said bar is swung from its full line nail receiving position (FIG. 3) just below the front plate 36 to its lowered dash-dot position in which the nail receiving bores of the bar are in alinement with the passages 46 respectively formed in metal funnels 47 carried by and forming part of the nail guiding unit. Adjustably secured to the raceway block 22 and to the main frame 68 are a pair of stop screws 162, 164 respectively which are engaged by the inverting block 40 to limit clockwise and counterclockwise movement of the block as viewed in FIG. 3. Attached to the lower ends of the funnels 47 of the nail guiding unit 48 are the above-mentioned flexible plastic tubes 50.

The bracket 154 has secured to it by screws 166 (FIG. 1) a light housing 168, said bracket and housing together enclosing the yielding drive unit 56. The shaft 150 which is secured to the inverting bar 40 has loosely mounted on it a pinion or drum 170 (FIGS. 5, 6, 7 and 8) meshing with the rack 157 which is reciprocable in the bore 158 in the bracket 154.

The nailing die slide 44 (FIG. 1) as above explained, is reciprocable forwardly and rearwardly of the machine and has mounted on it a roll 172 fitting in a notch 174 formed at the lower end of an arm 176 fixed to a shaft 178 journaled in the main frame 68 of the machine. Also secured to the shaft 178 is an arm 180 operatively connected through a rod 182 to a bell crank lever 184 pivotally mounted on a bearing 186 secured to the main frame, another arm 188 of the bell crank lever being pivotally connected to the lower end of an adjustable rod 190 the upper end of which is pivotally connected to a lug 192 secured to the floor plate 72 of the tilt pot hopper 20.

The shaft 178 has also secured to it an arm 194 operatively connected to the lower end of the rack 157 by a rod 196 the length of which may be varied to vary the timing of the transfer slide 30 and the inverting bar 40 as will appear later. During the heel attaching cycle of the above mentioned heel attaching machine the nailing die slide 44 is at rest in its forward position shown in FIG. 1, the hopper 20 being in its lowered or full line rest position. At the end of the heel attaching cycle of the machine the slide 44 moves rearwardly, that is to the right in FIG. 1, causing the hopper 20 to swing upwardly about the axis 97 of the trunnions 62 to its dash-line position (FIG. 1) and simultaneously therewith causing the rack 157 to be lowered. When the slide 44 reaches the rear end of its stroke the nailing die (not shown) carried by and forming part of the slide is arranged below the nail loader or tube holder 52 and dwells beneath the loader long enough to receive a load of nails dumped from the inverting roll 40 into the flexible tubes 50 and through the tubes 51 of the nail loader 52 into passages of the nailing die. As soon as the nailing die has received its load of nails the slide 44 moves forwardly to its heel attaching position causing the hopper 20 and the rack 157 to return to their lowered and raised positions respectively shown in FIG. 1.

In the operation of the nail distributor it occasionally happens that a bent or otherwise deformed nail becomes lodged between the front plate 36 and the inverting bar 40 on the one hand or between the inverting bar and the nail guiding unit 48 on the other hand with the result that unless some special provision is made, the operating parts of the machine are likely to be damaged. With the foregoing considerations in view the above-mentioned yielding drive unit 56 is interposed between the rack 157 and the shaft 150 which is secured to the inverting bar 40.

Figure 7:
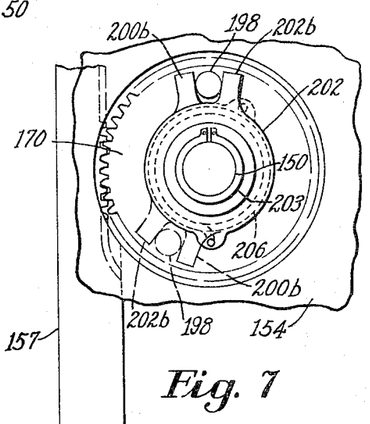
FIGS. 7 and 8 are views on the line VII—VII of FIG. 6 showing the yielding drive unit during normal and abnormal operation of the distributor.
Figure 8:
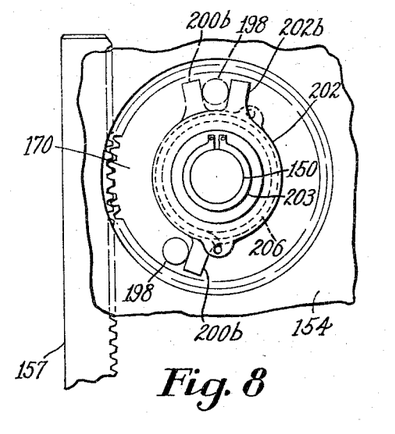

The yielding drive unit 56 comprises the drum 170 which is mounted for free rotation on the shaft 150 and has rigidly secured to it a drive pin 198 extending lengthwise of said shaft. Also freely mounted on the shaft 150 are collars 200, 202 spaced by a drive sleeve 204 which is pinned to the shaft 150 and has axially extending from its opposite ends flanges 204a, 204b respectively arranged in opposed relation to shoulders 200a, 202a respectively formed on the collars 200, 202. The shaft 150 has mounted on it a snap ring 203 for holding the yielding drive unit 56 in its proper position on the shaft 150. The collars 200, 202 are also provided with radially projecting lugs 200b, 202b respectively which are normally biased into engagement with opposite sides of the drive pin 198 by a torsion spring 206 opposite ends of which are secured to the collars 200, 202, the construction and arrangement being such that when the lugs 200b, 202b engage the drive pin 198 the shoulders 200a, 202a of the collars 200, 202 respectively are substantially in engagement with the flanges 204a, 204b of the drive sleeve 204. The lugs 200b, 202b of the sleeves 200, 202 are initially biased against the drive pin 198 with sufficient pressure to insure that in the normal operation of the nail distributor the flanges 204a, 204b of the sleeve 204 and the shoulders 200a, 202a of the collars 200, 202 will be in engagement respectively causing the inverting bar shaft 150 to be driven to its full extent determined by the studs as illustrated in FIG. 7. However, should a nail become lodged between the front plate 36 and the inverting bar 40 it will be clear that as the rack 157 is depressed and accordingly the drum 170 is rotated counterclockwise as shown in FIG. 8, the shoulder 200a of the collar 200 will move away from the flange 204a of the sleeve 204 as allowed by the yielding of the spring 206, the sleeve being held stationary and the drive pin 198 moving away from the lug 202b of the collar 202 during this movement. If the nail is stuck between the nail guiding unit 48 and the inverting bar 40 in its inverted dash-dot position (shown in FIG. 3) and the power operated rack 157 is raised, the collar 202 will be rotated clockwise (FIG. 5) on the shaft 150 by the drive pin 198, the shoulder 202a of this collar moving away from the flange 204b of the sleeve 204, the collar 200 at this time being held stationary by the engagement of its shoulder 200a with the flange 204a of the sleeve 204, the spring 206 yielding to allow rotation of the collar 202 with relation to the collar 200. As above explained, clockwise and counterclockwise rotation (FIG. 3) of the inverting bar 40 is limited by the stop screws 162, 164 and any overriding of the rack 157 in either direction after engagement of said bar with one or the other of the stop screws will be accommodated by the yielding action of the spring 206.

The bracket 154 has secured to it a mount 208 (FIGS. 1, 2 and 12) adapted to support mechanism for operatively connecting the rack 157 to the transfer slide 30. Mounted on a fulcrum pin 210 secured to the mount 208 is the abovementioned bell crank lever 130 into an upper arm of which is threaded a stop screw 214 (FIGS. 1 and 2), said screw being constantly biased toward a stop face 216 of the mount by a coil spring 218 lower and upper ends of which are attached respectively to the mount and to a pin secured to the lever. The bell crank lever 130 has mounted on its upper arm the above-mentioned yielding drive unit 54 which comprises a cylinder 220 in which slides a spring-pressed plunger 222, and a spring 224 interposed between the plunger and a screw 226 threaded onto the top end of the cylinder. A lower arm of the bell crank lever 130 has pivotally connected to it the link 126 which as above explained is provided with a hoop-shaped portion operatively connected to the shoulder screw 128 threaded onto the right end of the transfer slide 30.

When the nail distributor is idle the rack 157 is in forced engagement with the spring-pressed plunger 222, the spring 224 being extended and the stop screw 214 being spaced from the stop face 216 of the mount 208. It will be noted that at this time the slots 32 of the transfer slide 30 are arranged opposite the channels 34 formed in the front plate 36, nails delivered by the slide from the raceways 24 of the composite block 22 having fallen down said channels into the bores 38 of the inverting bar 40 and hanging by their heads in said bores.

Figure 12:
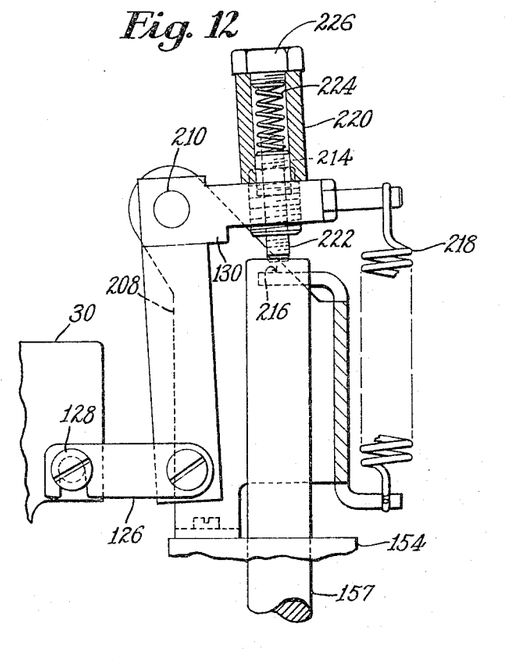
FIG. 12 is a view on the line XII—XII of FIG. 1 showing details of mechanism for operating a nail transfer slide of the illustrative machine.

When the rack 157 is lowered, in response to rearward movement of the nailing die slide 44, the bell crank lever 130 is rotated clockwise as viewed in FIG. 12 under the action of the spring 218 until the screw 214 engages the stop face 216, said clockwise movement resulting in the transfer slide being moved to the left, as viewed from the front of the machine, until the slots 32 in said slide are in register with the forward ends of the raceways 24. The transfer slide 30 rests in this position while the nailing die (not shown) forming part of the slide 44 is at rest beneath the nail loader 52, said die at this time receiving a load of nails from the inverting bar 40 which during downward movement of the rack 157, is moved from its full-line position to its dash-dot position shown in FIG. 3. It will be noted that when the rack 157 is in its depressed position it is spaced substantially away from the spring-pressed plunger 222. During the last portion of the upward movement of the rack 157 the upper end of said rack engages the spring-pressed plunger 222 and during its continued upward movement swings the bell crank lever 130 counterclockwise (FIG. 12) about the fulcrum pin 210 thus moving the transfer slide 30 about ¼" to the right, as viewed from the front, into a position in which the slots 32 of said transfer slide are in register with the channels 34 of the front plate 36, the inverting bar 40 then being in its full-line position (FIG. 3) ready to receive the nails which fall down said channels of said front plate into the bores 38 of the bar.

If a bent or otherwise deformed nail "caught" between the raceways 24 and the transfer slide 30 should prevent the transfer slide from moving to the right, as viewed from the front of the machine, the spring 224 of the yielding drive unit 54 will yield in the cylinder 220 as the rack 157 moves to its raised position thereby insuring against any breakage of the machine parts. In view of the fact that the transfer slide 30 is returned by the spring 218 to its position in which the slots 32 are in register with the raceways 24 of the composite raceway block 22, it will be apparent that if the nails for any reason should become lodged between the slots of the transfer slide and the channels 34 of the front plate 36 no harm will result to the machine parts.

As above explained, in tilt pot hoppers 20 of the general type disclosed herein there is a tendency for "loose" nails, which are not properly controlled and are not hanging by their heads in oriented positions in the nailways 28, to interfere with the "flow" of the control or oriented nails down the nailways. In order to reduce the above interference to a minimum the tilt pot hopper 20 is provided with a nailway clearer 228 (FIGS. 1, 4, 9 and 11) which will now be described.

The nailway clearer 228 has the form of a brush 230 comprising a plurality of bristles secured by screws in a recess 232 (FIGS. 9 and 11) of a metal holder 234, said holder having secured to it a flexible metal plate 236, the lower end of which bears against the bristles. The position of the plate 236 may be varied heightwise of the brush 230 to vary the effective siffness of the brush as it moves counterclcokwise as viewed in FIGS. 1, 9 and 11.

The brush holder 234 is secured to a pair of carrier bars 238 which are secured by screws to a shaft 240 journaled on a U-shaped carrier frame 242 pivotally mounted, outside of the hopper housing 76, on the ends of a bearing rod 244 secured to said housing. The right end portion of the carrier frame 242, as viewed from the front of the machine, has a depending arm 246 which carries a roll 248 and has formed in it upper and lower L-shaped notches 250, 252. Secured to the left end of the shaft 240 is a link 254 pivotally connected at its lower end to a link 256 fulcrumed on the mount 66. The carrier frame 242 by reason of its unbalanced weight about the bearing rod 244 tends to rotate clockwise, as viewed in FIGS. 9 and 11, but in order to insure that the frame is constantly biased clockwise there is provided a spring 257 upper and lower ends of which are attached respectively to the carrier frame and to the floor plate 72 of the hopper 20.

Fulcrumed on a shoulder screw 258 secured to the housing 76 of the hopper 20 is a pawl 260 which is constanly urged counterclockwise on said housing, as viewed in FIGS. 1, 9, 10 and 11, by a coil spring 262. A rod 264, which is positioned inside the coils of the spring 262, when the pawl 260 is in its position shown in FIG. 11, has its upper and lower ends in engagement with faces respectively of the carrier frame 242 and the pawl, serves to limit counterclockwise movement of the pawl.

As above explained in order to insure that the nails 26 shall not jam in the nailways 28 especially at the entrance portions of the tunnels 96, it is desirable that the nails, which have moved forwardly along the flat upper face 84 of the floor plate 72 of the hopper 20 each time that the hopper is swung to its raised position, shall be moved back into the rear end of the hopper during movement of the hopper to its lowered position.

It is desirable to cause the nails 26 to move forwardly along the nailways 28 solely under the force of gravity, it having been found that when the nails are forced forwardly by the nailway clearer jams are likely to occur. With the above considerations in view the brush 230 sweeps rearwardly in forced engagement with the flat upper face 84 of the hopper floor plate 72 as the hopper is moved to its lowered full-line position, said brush being held in spaced relation with said face 84 as it swings forwardly as the hopper is moved to its raised dash-line position. The timing of the brush 230 is such that before the loose or non-oriented nails in the hopper 20 slide forwardly to the forward end of the face 84 of the floor of the hopper the brush will be in its position shown in FIG. 9 and will act as a barrier to prevent any substantial number of loose nails from sliding to the forward end of the hopper. In view of the foregoing the brush 230 will clear the nailways of non-oriented nails during its rearward travel in the hopper and will not interfere with the normal forward "flow" of the nails during its forward travel. Moreover, by causing the brush 230 to act as a barrier at the forward end of its travel in the hopper 20 there will not be any lagging nails following the brush during its rearward movement in the hopper while lagging nails tend to interfere with the free flow or oriented nails in the nailways.

Figures 9, 10, 11:
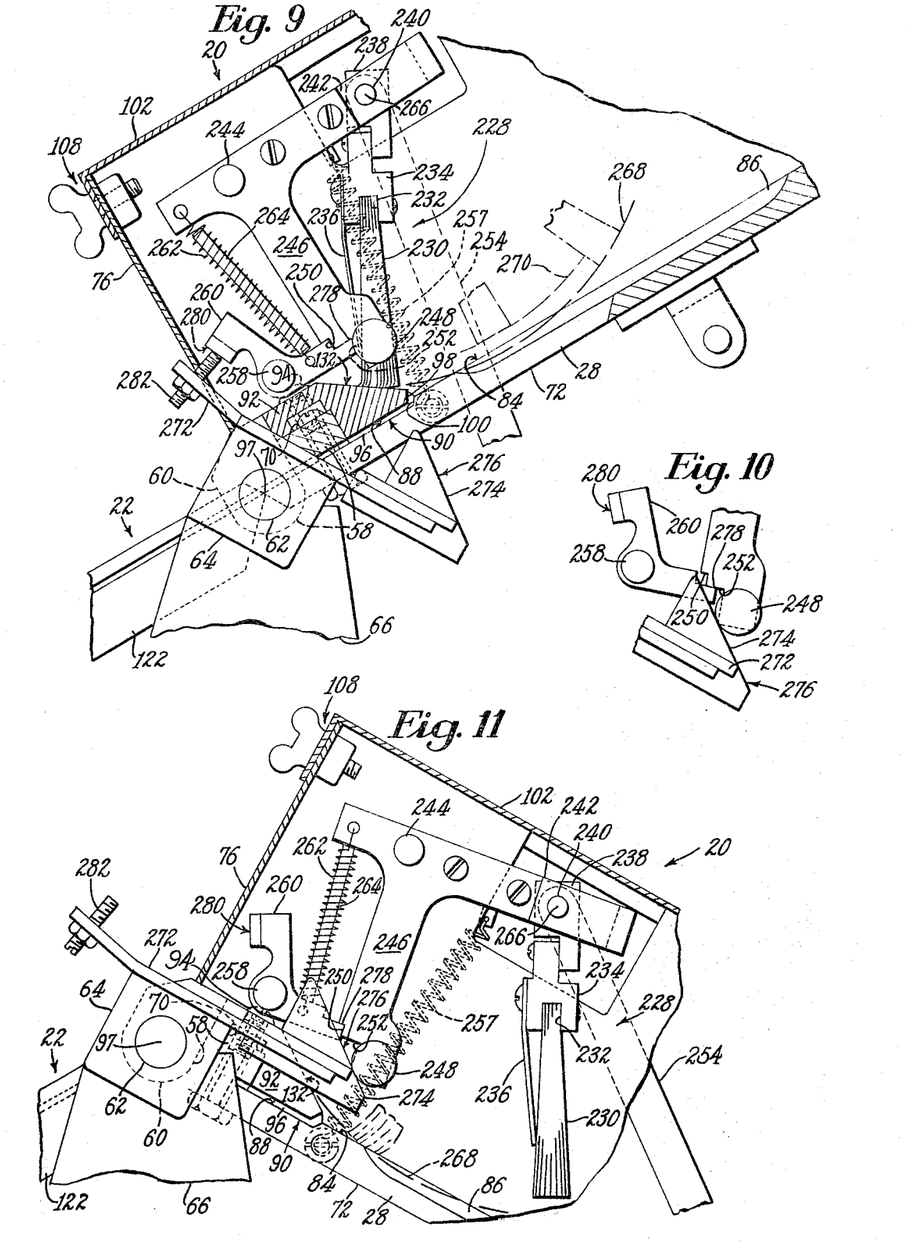
FIG. 9 shows in side elevation a nailway clearer, which forms part of the tilt pot hopper, at the time that the hopper is in its raised position.
FIG. 10 is a side view of portions of mechanism shown in FIG. 9 for controlling the operation of the nailway clearer.
FIG. 11 is a view similar to FIG. 9 showing the nailway clearer at the time that the hopper is in its lowered idle position.

With the above consideration in view the axis 266 of the brush supporting shaft 240 is so located that the lower end of the brush 230, in moving counterclockwise (FIG. 9) about the axis during movement of the hopper 20 to its lowered position, shall engage with sweeping action the lower end portion of the face 132 of the ramp block 92 and shall move rearwardly across entrances of the tunnels 96 and along the floor 84 of the plate 72 of the hopper to its dash-dot position shown in FIG. 9. The location of the lower end of the brush 230 if not flexed during this movement is represented by an arc 268.

As the brush 230 reaches the end of its rearward or counterclockwise movement (FIG. 9) the axis 266 of the shaft 240 is moved about the bearing rod 244 as will appear presently, to a raised or secondary position relatively to the hopper housing 76 with the result that the brush, during the following upward swinging movement of the hopper, moves forward or clockwise in an arc 270 arranged in spaced relation with the floor 84 of the floor plate 72 of the hopper until just before said hopper reaches its raised position when the axis 266 of said shaft 240 is again moved about the bearing rod 244 to its lowered or primary position, the brush moving down against the lower end portion of the face 132 of the ramp 92 preparatory to swinging counterclockwise as above described during movement of the hopper to its lowered position.

Fixedly mounted on the right upstanding boss 64 of the mount 66 (as viewed from the front of the machine) is a plate 272 having secured to it a cam 274 provided with an inclined face 276 which during the last portion of the downward movement of the hopper 20 is engaged by the roll 248, which is mounted on the depending arm 246 of the carrier frame 242, causing the carrier frame 242 to be rotated slightly counterclockwise about the bearing rod 244 as indicated in FIG. 10.

During downward swinging movement of the hopper 20 about the axis 97 of the trunnions 62 and simultaneously rearwardly swinging movement of the brush 230 about the axis 266 of the shaft 240, a corner 278 of the pawl 260 is in engagement with the notch 252 of the arm 246 of the carrier frame 242 and accordingly the axis 266 of the shaft 240 is arranged in its lowered position in the hopper housing 76, the lower end of the brush, assuming that the brush is not bent, moving in the arc 268 as above explained. The engagement of the cam face 276 by the cam roll 248 at the end portion of the above movement causes the carrier frame 242 and accordingly its depending arm 246 to be swung slightly counterclockwise about the axis of the bearing rod 244 to a position in which the corner 278 of the pawl 260 biased by the spring 262 is allowed to enter the notch 250 of said arm, the hopper thereafter coming to rest in its lowered position shown in FIG. 11. The carrier frame 242 is now in a position in which the axis 266 of the shaft 240 is arranged in its raised position in the hopper housing 76.

Figure 1:
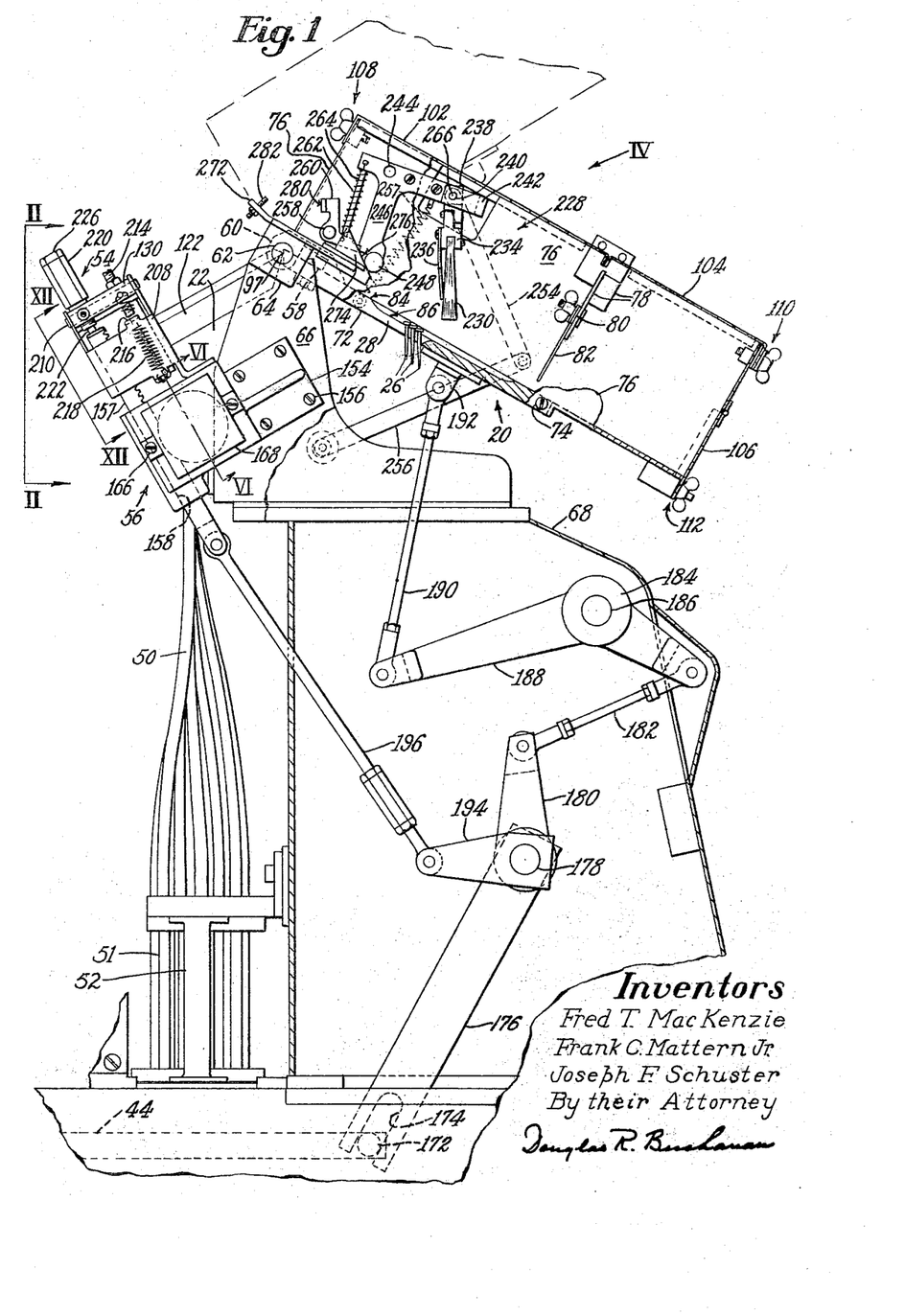
FIG. 1 is a side view, partly in section and partly broken away, of the illustrative nail distributor.

When the machine disclosed in application Serial No. 256,885 has operated through its heel attaching cycle and the nailing die slide 44 is being moved to its rearward position the hopper 20 is swung to its raised dash-line position shown in FIG. 1 with the result that the brush while moving with the hopper is swung clockwise in the hopper about its axis 266 the lower end of the brush moving along the arc 270 which is spaced a substantial distance above the face 84 of the floor plate 72.

Just before the hopper 20 reaches its raised dash-line position (FIG. 1) a face 280 of the pawl 260 engages a screw 282, which is secured to but is initially adjustable on the plate 272, causing the pawl to rotate clockwise as viewed in FIG. 9 on the shoulder screw 258 and allowing the biased carrier frame 242 to rotate clockwise on the bearing rod 244 until the corner 278 of the pawl engages in the notch 252 formed in the arm 246 of the carrier frame. When this occurs the axis 266 of the shaft 240 is in its lowered position in the hopper housing 76 and accordingly when the hopper moves to its lowered full-line position (FIG. 1) the lower end of the brush 230 would move in the arc 268 were it not deflected by engagement with the bottom of the hopper.

Having thus described our invention, what we claim as new and desire to secure by Letters Patent of the United States is:

1. In a nail distributor, a hopper tiltable about an axis and having a floor which is provided with a plurality of nailways extending lengthwise of said hopper at approximately right angles to said axis, means for moving the hopper about said axis between elevated and lowered positions respectively in which the nailways are arranged above and below a horizontal plane including said axis, a nailway clearer, means for moving the nailway clearer toward said axis to a projected position as the hopper is moved to its elevated position and for moving the nailway clearer away from said axis to a retracted position as the hopper is moved to its lowered position, means for causing the nailway clearer in moving from its projected to its retracted position to be forced against a portion of the floor of the hopper whereby to remove nails, which are on said portion of the floor and are not hanging by their heads in the nailways, rearwardly away from said nailways, and means for causing the nailway clearer to be retained a substantial distance from the floor of the hopper in moving from its retracted to its projected position whereby to insure that the clearer shall not interfere with nails on said floor portion during such movement.

2. In a nail distributor, a hopper which is tiltable about an axis and has a floor provided with a plurality of nailways extending lengthwise at approximately right angles to said axis, means for moving the hopper about said axis to inclined elevated and inclined lowered positions respectively in which the nailways are above and below a horizontal plane including said axis, a nailway clearer means for moving said clearer rearwardly in contact with the floor of the hopper from a projected position to a retracted position during movement of the hopper to its lowered position whereby to remove from the floor of the hopper nails which are not hanging by their heads in said nailways, and means for moving said clearer in spaced relation with the floor of the hopper to its projected position during movement of the hopper to its raised position.

3. In a nail distributor, a hopper which is tiltable about an axis and has a floor provided with a plurality of nailways extending lengthwise of the hopper at approximately right angles to the axis, means for moving the hopper about said axis to inclined elevated and lowered positions respectively in which the nailways are arranged above and below a horizontal plane including said axis, a brush which is carried by and extends transversely across the inside of the hopper, means for moving the brush rearwardly in contact with the floor of the hopper from a projected to a retracted position during movement of the hopper to its lowered position whereby to remove from the floor of the hopper, in the vicinity of the nailways, nails which are not hanging by their heads in the nailways, and means for moving the brush in spaced relation with the floor from its retracted to its projected position.

4. In a nail distributor, a hopper which is tiltable about an axis and has a floor provided with a plurality of nailways disposed at substantially right angles to said axis, means for tilting the hopper in opposite directions to raised and lowered positions in which the nailways are arranged respectively above and below a horizontal plane including said axis, a flexible nailway clearer carried by and movable on the hopper, means for moving from a projected to a retracted position the clearer in forced engagement with a nailway floor portion of the hopper as the hopper is moved from its raised to its lowered position whereby to cause nails which are not hanging by their heads in the nailways to be removed from said nailway floor portion, means for operating, while the hopper is moved from its lowered to its raised position, the nailway clearer back to its projected position and for causing the clearer to be spaced from the nailway floor portion whereby to insure that the nails are not wiped forwardly in the hopper by the clearer, and means for causing the clearer as it arrives at its projected position to be forced against a floor portion of the hopper to prevent nails from moving forwardly past the clearer.

5. In a nail distributor, a hopper tiltable about a generally horizontal axis and having a floor provided with a plurality of nailways disposed generally at right angles to said axis, means for tilting the hopper in opposite directions between raised and lowered positions in which the nailways are arranged above and below a horizontal plane including said axis, a flexible brush which is pivotally mounted on the hopper and extends widthwise across the inside of the hopper, means for swinging the brush from a projected position in forced engagement with a nailway floor portion of the hopper as the hopper is moved from its raised to its lowered position whereby to cause nails which are not hanging by their heads in the nailways of the hopper to be cleared from said nailway floor portion, and means for swinging the brush back to its projected position while the brush is spaced from said floor and as the hopper is moved from its lowered to its raised position whereby to insure that nails are not wiped by said clearer forwardly in the hopper.

6. In a nail distributor, a hopper which is tiltable about a horizontal axis and has a floor, a plurality of inclined raceways, a plurality of nailways which are formed in said floor and extend generally at right angles to said axis and which are adapted to guide nails, which have heads and are oriented and hang by their heads in the nailways, forwardly along the nailways and into the raceways, a block which is in enegagement with and is arranged above a forward end portion of the floor of the hopper adjacent to said axis and which forms with said floor tunnels which extend over the forward end portions of the nailways and are slightly larger in cross section than are the heads of the nails, means for moving the hopper about said axis between elevated and lowered positions in which the nailways are arranged above and below a horizontal plane including said axis whereby to cause nails which are in the hopper and are oriented in the nailways to be fed forwardly along said nailways and into the raceways, a clearer, means for moving said clearer over entrance portions of the tunnels and rearwardly in contact with the floor of the hopper as the hopper is lowered about said axis for clearing nails, which are not oriented in the nailways, into the rear portion of the hopper, and means for returning said clearer in spaced relation with the floor and into engagement with said block.

7. In a nail distributor, a hopper which is tiltable about a horizontal axis and has a floor comprising an elevated portion and a low forward end portion, a plurality of inclined raceways having upper ends arranged adjacent to said axis, a plurality of nailways which are formed in the floor of the hopper and extend generally at right angles to said axis and are adapted to guide nails, which have heads and are oriented in the nailways, past said axis and into the raceways, means for moving the hopper about said axis between elevated and lowered positions in which the nailways are arranged respectively above and below a horizontal plane including said axis, a block inside the hopper engaging the low forward end portion of the floor of the hopper and having channels which extend over the forward ends of the nailways and form with the low forward end portion of the floor tunnels which are slightly larger in cross section than are the heads of the nails, a nailway clearer, means for moving said clearer rearwardly of the hopper over entrance portions of the tunnels and in contact with the elevated portion of the floor of the hopper, as the hopper is swung about said axis to its lowered position, for sweeping nails, which have not been oriented in the nailways, into the rear end of the hopper, said entrance portions of the tunnels respectively being disposed at sharp angles to general planes of the elevated and lower portions of the floor and forming with the low portion of the floor shoulders which are adapted to retain nails oriented in the nailways below the tunnels from moving back out of the tunnels during movement of the hopper to its lowered position and means for returning the clearer forwardly in spaced relation with the floor to a position of contact with the top of the block as the hopper is swung to a raised position.

8. In a nail distributor, a hopper which is tiltable about a horizontal axis and has a floor, a plurality of inclined raceways, a plurality of nailways which are formed in said floor and extend generally at right angles to said axis and which are adapted to guide nails, which have heads and are oriented and hang by their heads in the nailways, forwardly along the nailways and into the raceways, a block which is in engagement with and is arranged above a forward end portion of the floor of the hopper adjacent to said axis and which forms with said floor portion tunnels which extend over the forward end portions of the nailways and which receive nails from rear exposed portions of the nailways, means for moving the hopper about said axis between elevated and lowered positions in which the nailways are arranged above and below a horizontal plane including said axis whereby to cause nails which are in the hopper and are oriented in the nailways to be fed forwardly along said nailways and into the raceways, a nailway clearer brush mounted on the hopper for movement between projected and retracted positions, means for moving the brush from its projected position rearwardly in contact with the floor and over entrance portions of the tunnels and for sweeping the brush over the rear exposed portions of the nailways as the hopper is moved to its lowered position whereby to clear said nailways and means for returning the brush in spaced relation with the floor forwardly to its projected position.

9. In a nail distributor, a hopper which is tiltable about a horizontal axis and has a floor, a plurality of inclined raceways, a plurality of nailways which are formed in said floor and extend generally at right angles to said axis and which are adapted to guide nails, which have heads and are oriented and hang by their heads in the nailways, forwardly along the nailways and into the raceways, a block which is in engagement with and is arranged above a forward end portion of the floor of the hopper adjacent to said axis and which forms with said floor portion tunnels which extend over the forward end portions of the nailways and which receive nails from rear exposed portions of the nailways, means for moving the hopper about said axis between elevated and lowered positions in which the nailways are arranged above and below a horizontal plane including said axis whereby to cause nails which are in the hopper and are oriented in the nailways to be fed forwardly along said nailways and into the raceways, a nailway clearer brush mounted on the hopper for movement between projected and retracted positions, means for moving the brush from its projected position rearwardly over entrance portions of the tunnels and for sweeping the brush over the rear exposed portions of the nailways as the hopper is moved to its lowered position whereby to clear said nailways, and means for moving, as the hopper is moved to its raised position, the brush forwardly in the hopper in spaced relation with the exposed portions of the nailways and then to its projected position into forced engagement with the block just forwardly of the entrance portions of the tunnels, said brush in this position insuring that nails tumbling forwardly in the hopper shall not move forwardly of the brush.

10. In a nail distributor, a hopper tiltable about a horizontal axis and having a floor provided with a plurality of nailways which are disposed generally at right angles to said axis and in which nails hang by their heads, means for tilting the hopper in opposite directions about said axis to raised and lowered positions in which the nailways are arranged above and below a horizontal plane including said axis, a flexible nailway clearer which extends over the floor of the hopper from one side of the hopper to the other and is journaled on the hopper for movement about a clearer axis movable between first and second positions with relation to the hopper, means responsible to movement of the hopper from its raised position to its lowered position for swinging the clearer about the clearer axis in its first position from a projected position to a retracted position in forced engagement with a nailway floor portion of the hopper whereby to cause nails which are not hanging by their heads in the nailways to be cleared from said nailway floor portion, means responsive to movement of the nailway clearer to its retracted position for shifting the clearer axis to its second position with relation to the hopper, and means responsive to movement of the hopper from its lowered to its raised position during movement of the hopper to its raised position for moving the nailway clearer about its axis in its second position in the hopper whereby to cause the clearer in moving from its retracted position to its projected position to be spaced from the nailway floor portion of the hoper thus insuring that nails are not wiped by said clearer forwardly along the hopper during this movement of the clearer.

11. In a nail distributor, a hopper which is tiltable about a horizontal axis and has a floor, a plurality of inclined raceways, a plurality of nailways which are formed in said floor and extend generally at right angles to said axis and which are adapted to guide nails, which have heads and are oriented and hang by their heads in the nailways, forwardly along the nailways toward said axis and into the raceways, means for moving the hopper about said axis to inclined elevated and inclined lowered positions in which the nailways are arranged respectively above and below a horizontal plane including said axis, a flexible nailway clearer brush mounted on the hopper and extending from one inner side wall of the hopper to the other, means for moving the brush rearwardly along the floor of the hopper when said hopper is moved toward its inclined lowered position, means for moving the nailway clearer forwardly in the hopper in spaced relation with said floor when the hopper is moved toward its elevated inclined position, and means for varying the effective stiffness of the brush.

12. In a nail distributor, a hopper which is tiltable about a horizontal axis and has a floor, a plurality of inclined raceways, a plurality of nailways which are formed in said floor and extend generally at right angles to said axis and which are adapted to guide nails, which have heads and are oriented and hanging by their heads in the nailways, forwardly along the nailways toward said axis and into the raceways, means for moving the hopper about said axis to inclined elevated and inclined lowered positions in which the nailways are arranged above and below a horizontal plane including said axis, a frame pivoted on the hopper, a shaft journalled in the frame, a nailway clearer secured to the shaft, means for swinging the shaft in the frame in opposite directions in response to movement of the hopper to its elevated and to its lowered positions respectively, and means for changing the position of the frame on the hopper between movements of the hopper in opposite directions.

13. In a nail distributor, a hopper which is tiltable about a horizontal axis and has a floor, a plurality of inclined raceways, a plurality of nailways which are formed in said floor and extend generally at right angles to said axis and which are adapted to guide nails, which have heads and are oriented and hang on their heads in the nailways forwardly along the nailways toward said axis and into the raceways, means for moving the hopper about said axis between elevated and lowered positions in which the nailways are arranged above and below a horizontal plane including said axis, a shaft mounted in the hopper, a nailway clearer supported on said shaft, means for moving the shaft to raised and lowered positions in the hopper when the hopper has moved respectively to its lowered and elevated positions, and means for moving the nailway clearer rearwardly in contact with the floor of the hopper when the shaft is in its lowered position in the hopper and the hopper is being moved toward its lowered position and for moving the nailway clearer forwardly along but spaced from the floor of the hopper while the shaft is in its raised position in the hopper and the hopper is being moved to its elevated position.

References Cited by the Examiner
UNITED STATES PATENTS

| | | | |
|---|---|---|---|
| 415,726 | 11/1889 | Matzeliger | 221—177 X |
| 432,477 | 7/1890 | Casey | 221—68 X |
| 593,551 | 11/1897 | Abernathy. | |
| 652,220 | 6/1900 | Phelps | 221—167 X |
| 707,274 | 8/1902 | Stimpson | 221—187 X |
| 1,001,791 | 8/1911 | Wilcox | 221—162 |
| 1,803,993 | 5/1931 | Brennan | 221—162 |
| 1,851,980 | 4/1932 | Lund | 1—39 |
| 1,888,851 | 11/1932 | Donovan et al. | 221—165 X |
| 1,984,109 | 12/1934 | Balcom | 1—39 |
| 2,161,973 | 6/1939 | Paxton. | |
| 2,540,934 | 2/1951 | Cook et al. | 221—68 |
| 2,845,759 | 8/1958 | Cote et al. | |

M. HENSON WOOD, JR., *Primary Examiner.*

GRANVILLE Y. CUSTER, JR., KENNETH L. LEIMER, LOUIS J. DEMBO, *Examiners.*